Aug. 14, 1962 H. A. RENDLE 3,049,255
CAR CARRIER BOAT LOADING ATTACHMENT
Filed June 3, 1960 2 Sheets-Sheet 1

INVENTOR.
HAROLD A. RENDLE
BY
Gustave Miller
ATTORNEY

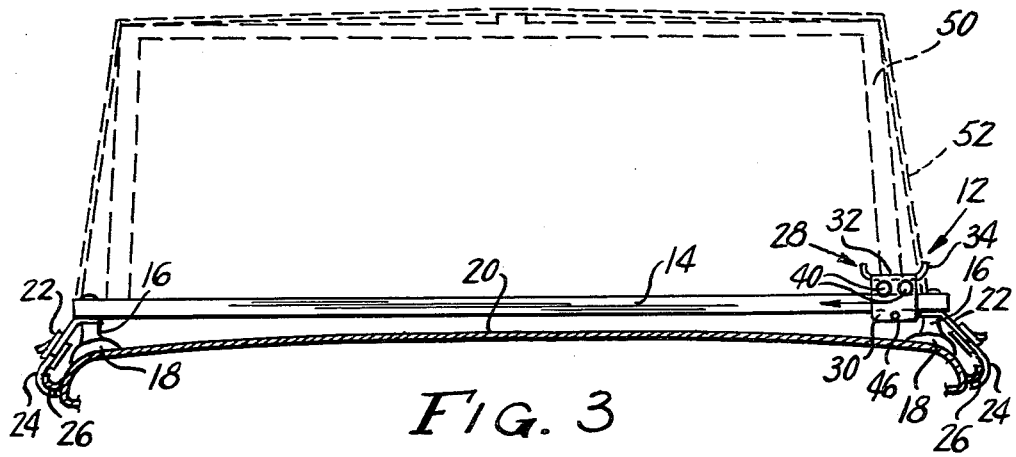
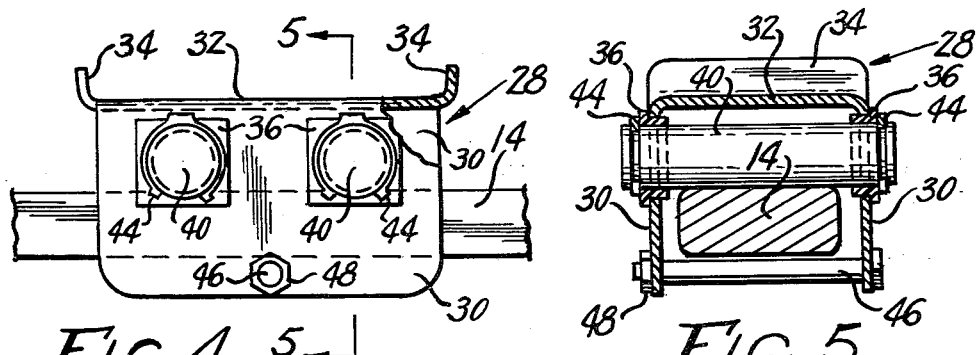
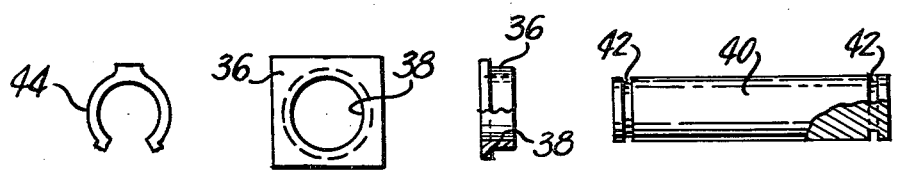
INVENTOR.
HAROLD A. RENDLE
BY
Gustave Miller
ATTORNEY

United States Patent Office 3,049,255
Patented Aug. 14, 1962

3,049,255
CAR CARRIER BOAT LOADING ATTACHMENT
Harold A. Rendle, Tupper Lake, N.Y., assignor to
Gustave Miller, Washington, D.C.
Filed June 3, 1960, Ser. No. 33,798
2 Claims. (Cl. 214—450)

This invention relates to a car carrier boat loading attachment for automobiles and the like, and it particularly relates to a car carrier device for loading a boat on an automobile top.

There have heretofore been provided various types of boat carrying attachments for automobiles; however, all these prior devices had one or more disadvantages, particularly in loading the boat onto the carrier. One disadvantage which almost all the prior devices shared in common was their undue complexity and bulk. This not only made them unduly expensive but also made it difficult to manipulate these devices which were, furthermore, subject to easy breakdown. On the other hand, in those few instances where the attachments were comparatively simple in structure, they were almost completely ineffective for the proper handling, loading and securing of the boats in place and often tended to cause damage to the boats held thereby.

It is one object of the present invention to overcome the above as well as other defects inherent in the prior art devices of this type by providing a boat holding attachment which is simple in construction, easy to use and completely effective for its purpose.

Another object of the present invention is to provide a car carrier boat loading attachment of the aforesaid type which is adapted to easily load and unload a boat from either side of the automobile.

Other objects of the present invention are to provide an improved boat loading attachment, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

FIG. 3 is a sectional view taken on line 3—3 of FIG. 2.

FIG. 4 is an enlarged side elevational view, partly broken away, of the loading and unloading carriage portion of the carrier attachment shown in FIGS. 1–3.

FIG. 5 is a sectional view taken on line 5—5 of FIG. 4.

FIG. 6 is a side elevational view, partly in section, of one of the supporting rollers of the carriage.

FIG. 7 is a side view, partly in elevation and partly in section, of one of the bearing elements for supporting the rollers such as shown in FIG. 6.

FIG. 8 is a front elevational view of the bearing of FIG. 7.

FIG. 9 is an elevational view of the lock ring utilized in holding the rollers in place.

Figure 1:
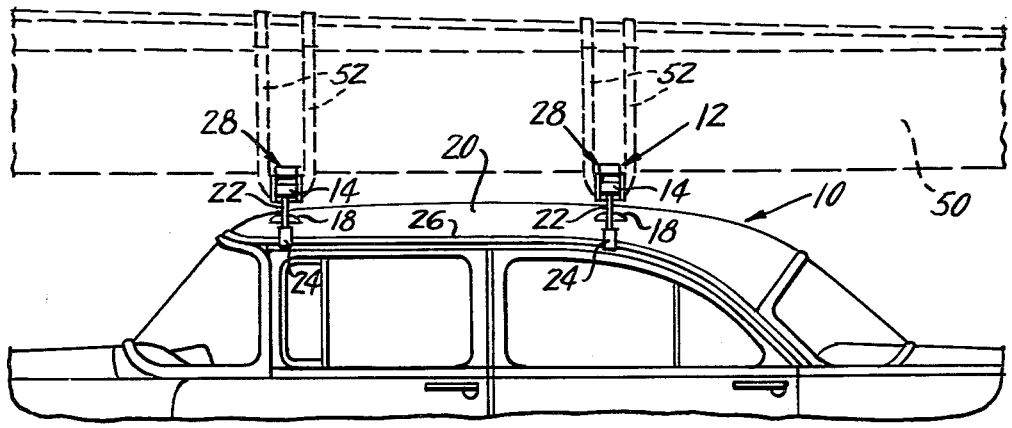
FIG. 1 is a side elevational view of an automobile to which a carrier and boat loading attachment embodying the present invention is attached.
Figure 2:
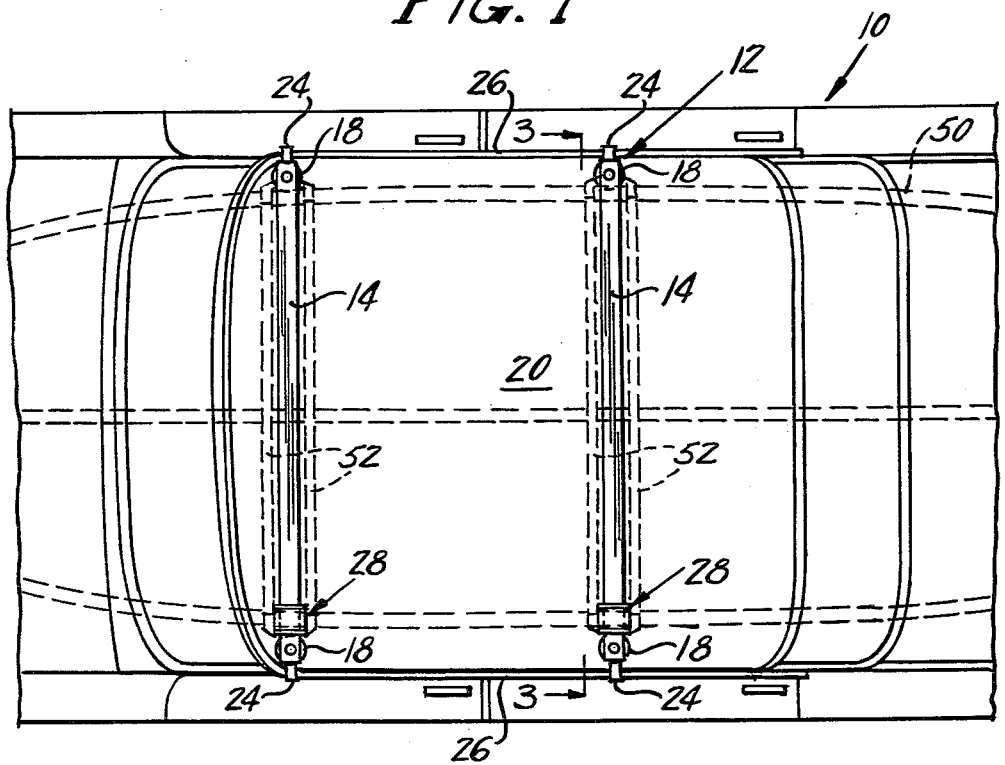
FIG. 2 is a top plan view of the arrangement shown in FIG. 1.

Referring in greater detail to the drawings wherein similar reference characters refer to similar parts, there is shown an automobile 10 on which is positioned a carrier generally designated 12.

The carrier 12 comprises a pair of laterally-spaced bars 14, each bar 14 having a foot 16 at each end provided with a suction cup 18 or the like for adhering to the top 20 of the automobile 10. Outwardly of each foot 16, the bars 14 are each provided with adjustable straps 22 having hooks 24 adapted to be engaged under the rain gutter 26 of the automobile. As thus far described the carrier per se is conventional and well known.

Each bar 14 is generally rectangular in cross-section and has slidably mounted thereon a carriage or saddle 28 comprising this essence of this invention, both per se and in combination with the carrier. This carriage 28 comprises a pair of side plates 30 connected at their upper ends by a saddle or bridge portion 32. This bridge portion 32 is provided at two opposite ends with curved lips or flanges 34 extending upwardly therefrom.

Immediately below the bridge portion 32, each side plate 30 is provided with a pair of laterally spaced apertures of generally square shape in each of which is positioned a similarly shaped bearing member 36 having a circular bearing opening 38 therein. The bearing members 36 are preferably constructed of nylon or the like.

The bearing members 36 of one plate 30 are respectively aligned with the corresponding bearing members 36 of the other plate 30 and between each pair of aligned bearing members 36 there is journaled a roller 40. Each of these rollers 40 is provided with an annular groove 42 at each end, these grooves 42 being positioned outwardly of their respective bearing members 36 when the rollers are in position journaled through the bearing members 36 in the side plates 30. Releasably engaged in each groove 42 is a resilient, split retainer ring 44 for holding the rollers in place.

The carriage 28 is adapted to be applied and removed from the respective bar 14 by slipping the carriage down over or moving it up and away from the bar 14. When the carriage 28 is in position on the bar 14, however, it is held in slidable engagement therewith by means of a bolt 46 beneath the bar 14 which extends between corresponding aligned holes in the plates 30 and which is retained in such position by a lock nut 48.

In operation, with the carrier in position on the automobile, the carriages 28 on the two bars 14 are slid over to either one side or the other of the car and the boat, which is indicated at 50, is lifted onto the carrier with the adjacent gunwale of the boat positioned on the carriages 28 which serve to prevent the boat from sliding off by means of the flanges 34. The carriages 28 are then slid along their respective bars 14 to the other side of the car while the other gunwale is lifted onto the carrier bar 14. During this sliding movement the carriages carry the boat over onto the top of the automobile (as illustrated in FIG. 3), in which position it is strapped in place as by means of the straps 52. When unloading the boat, the straps 52 are removed and the reverse procedure is followed whereby the carriages 28 are slid in the opposite direction.

From the above description, the extreme simplicity and yet high efficiency of the present device is clearly apparent. It is also worthy of note that unlike most other carriers of this general type, the present device permits easy loading from either side of the automobile or similar vehicle.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. For use in a conventional car top attachment including a pair of spaced apart parallel carrier bars and means for securing said bars transversely of the top of a car; a boat loading attachment consisting of a single boat gunwale cooperating carriage for each said bar, said carriage comprising a gunwale receiving saddle having spaced apart upwardly extending end lips, downwardly extending plate members depending from opposite sides of said saddle between said end lips, roller means journaled through both said plate members rollably supporting each said carriage on one said bar, means spaced below said roller means a distance slightly greater than the thickness of said bar removably secured through both said plate members for removably retaining said carriage on said bar, whereby a boat may be loaded on said bars by supporting one boat gunwale on both said carriages on the near side of the car top to carry said one boat gunwale to the far side of the car top to thus load the boat on said carrier rods.

2. The boat gunwale cooperating carriage of claim 1, said roller means comprising a pair of parallel rollers, said carriage retaining means comprising a bolt and nut extending through both said plate members below said parallel rollers.

References Cited in the file of this patent
UNITED STATES PATENTS

| | | |
|---|---|---|
| 2,561,199 | Harder | July 17, 1951 |
| 2,715,974 | Van Nest | Aug. 23, 1955 |
| 2,746,628 | Neyra | May 22, 1956 |
| 2,763,412 | Helander | Sept. 18, 1956 |
| 2,849,135 | Embler | Aug. 26, 1958 |